Oct. 11, 1932.    R. POWIS    1,881,934
PROCESS OF WELDING
Filed Sept. 15, 1930    2 Sheets-Sheet 1
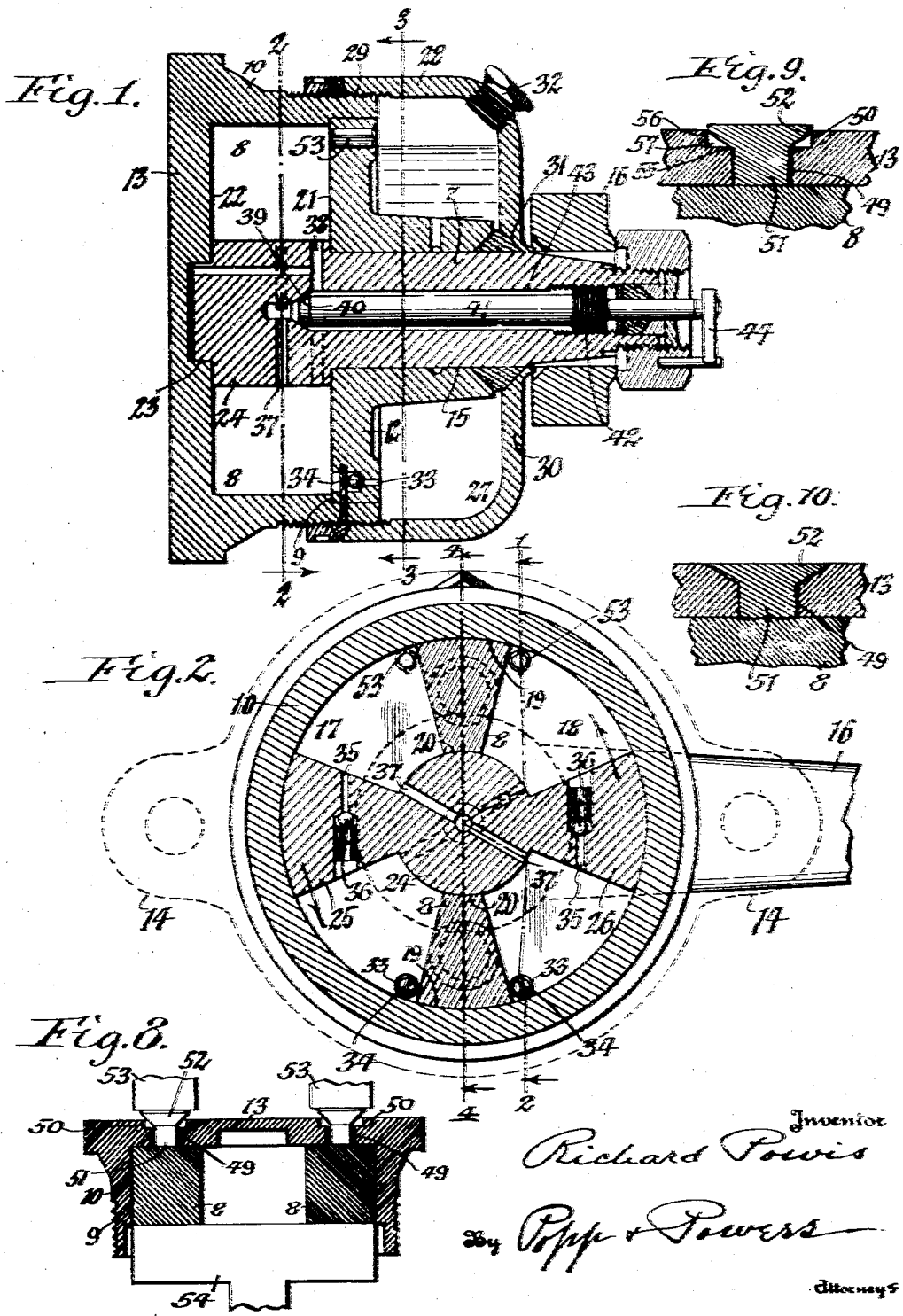
Inventor
Richard Powis
By Popp & Powers
Attorneys Oct. 11, 1932.   R. POWIS   1,881,934
PROCESS OF WELDING
Filed Sept. 15, 1930    2 Sheets-Sheet 2
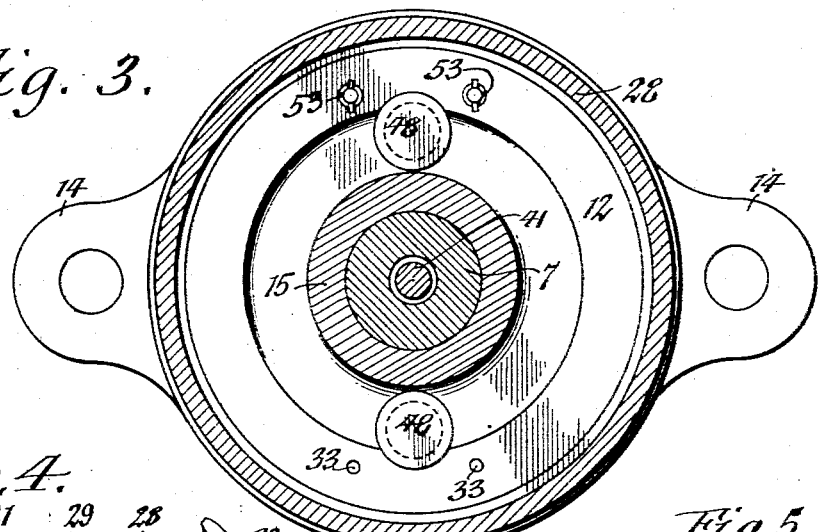
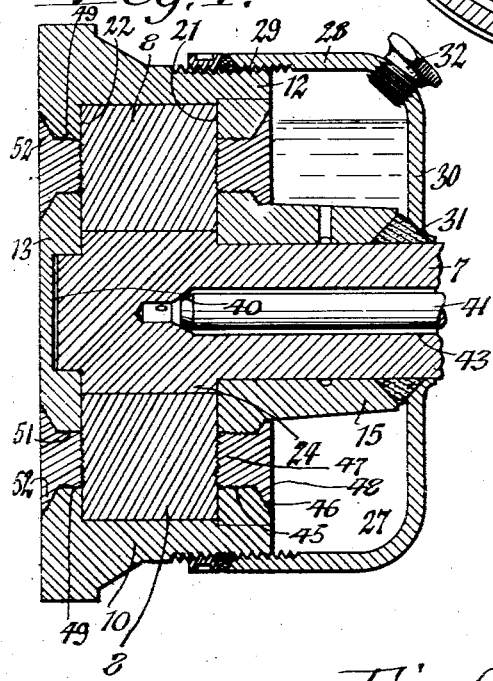
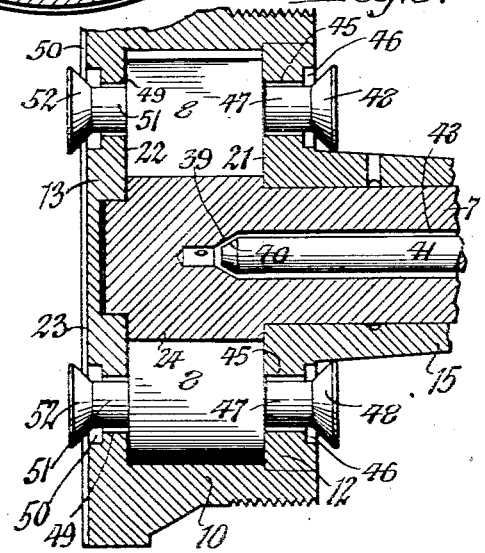
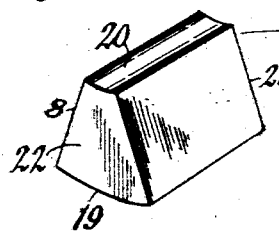
Inventor
Richard Powis
By Popp & Powers
Attorneys Patented Oct. 11, 1932

1,881,934

UNITED STATES PATENT OFFICE.

RICHARD POWIS, OF BUFFALO, NEW YORK, ASSIGNOR TO HOUDE ENGINEERING CORPORATION, OF BUFFALO, NEW YORK, A CORPORATION OF NEW YORK

PROCESS OF WELDING

Application filed September 15, 1930. Serial No. 481,920.

This invention relates to a method of connecting metal members by electric welding and to the product resulting from the use of this method.

Although this method may be used to advantage for the production of various articles in which greater strength, accuracy, tightness and economy in manufacture are requisites the same is shown in the present case for illustrative purposes in connection with a hydraulic shock absorber of the Houdaille type.

In such shock absorbers a resistance liquid is interposed between a working cylinder and a piston which are moved one relative to the other by connecting them with relatively movable parts of an automobile so that the liquid is subjected to pressure and absorbs the shock.

Such shock absorbers have heretofore been provided within the hollow body with a partition which formed a wall of a working chamber therein and the cooperating surfaces of this body and partition were usually machined and carefully fitted together at considerable expense.

It is the purpose of this invention to provide simple and efficient means whereby the partition and the body of the shock absorber or other metallic members of articles are reliably connected by electrical welding without requiring accurate fitting or machining of the parts, and eliminating other less satisfactory methods of assembling parts.

In the accompanying drawings:

Figure 1 is a vertical longitudinal section of a shock absorber having parts assembled and secured to each other in accordance with my invention.

Figure 2 is a vertical cross section of the same taken on line 2—2, Fig. 1, looking forwardly.

Figure 3 is a similar view on line 3—3, Fig. 1, looking rearwardly.

Figure 4 is a fragmentary vertical longitudinal section taken on line 4—4, Fig. 2.

Figure 5 is a fragmentary vertical longitudinal section similar to Figs. 1 and 4 but showing the relative position of the parts before the partition is connected with the body by electrical welding.

Figure 6 is a perspective view of one of the sections of the partition in the body.

Figure 7 is a similar view of one of the plugs used for producing a welded joint between the body and the partition therein.

Figure 8 is a diagrammatic view showing the means for electrically fusing the plug for connecting a partition of a shock absorber to a wall thereof.

Figure 9 is a fragmentary sectional view showing the condition of the welding plug during the early stage of the operation of connecting two metallic members by an electrically welded plug in accordance with this invention.

Figure 10 is a similar view showing the completion of the connection and the amalgamation of the welding plug with the partition and the body wall of the absorber.

In the following description similar characters of reference indicate like parts in the several figures of the drawings.

The body of this shock absorber preferably is made of hard cast iron or forged steel and comprises a peripheral wall 10 of cylindrical form on its inner side, a transverse front wall 12 engaging with a shoulder 9 on the front end of the peripheral wall and having a flat rear face, and a transverse rear wall 13 preferably formed integrally with the rear end of the peripheral wall and having a flat front face. The peripheral wall is provided on opposite sides of its exterior with laterally projecting perforated lugs 14 which are adapted to receive bolts or screws for attaching the body to the frame of an automobile. The front wall of the absorber body is provided centrally with a forwardly projecting tubular bearing 15 in which a piston operating rock shaft 7 is journaled. This shaft is provided at its front end externally of the absorber with an operating arm or lever 16 which is connected in any suitable manner with one of the wheel axles of the car or any other member which is movable relatively to the car frame as the spring system between the axle and car frame is alternately compressed and relaxed.

The space within the body is divided into two semi-cylindrical working chambers 17, 18 by a partition consisting in the present case preferably of two sections 8, 8 arranged on diametrically opposite sides of the axis of the body and having their inner opposing sides provided with concave curved faces 20, 20 which are spaced from each other, and having their outer sides provided with convex curved faces 19, 19 which engage with the cylindrical face of the peripheral wall 10 while the front and rear ends of these partitions are provided with flat transverse faces 21, 22 which engage respectively with the flat rear side of the front wall 12 and the flat front side of the rear wall 13 of the body.

The rear end of the rock shaft is journaled in a bearing 23 formed on the central part of the rear wall and within the body the shaft is provided with a hub 24 from which pistons, vanes or wings 25, 26 project laterally into the working chambers and are oscillated therein upon rocking this shaft. The shaft, the pistons and the hub connecting the same are preferably formed integrally but if desired they may be made separate and assembled as a unit.

Resistance liquid is supplied to the working chambers from a replenishing chamber or reservoir 27 which is formed in a casing having a peripheral wall 28 connected with the peripheral wall of the body by a screw joint 29 and a front head 30 having a central opening 31 through which the front part of the operating shaft passes. The replenishing chamber is filled through a filling opening in its top which is normally closed by a screw plug 32 and liquid is drawn from this replenishing chamber into the lower end of one or both of the working chambers through one or more replenishing ports 33 extending through the lower part of the front wall so as to connect the lower parts of the replenishing and working chambers but the passage of liquid from the lower end of the working chambers into the replenishing chamber is prevented by check valves 34 which are arranged in the ports 33 and which open only toward the working chambers.

As the pistons move in the direction in which they effect a low compression stroke, which is opposite to the direction indicated by the arrows in Fig. 2, the resistance liquid is permitted to pass through a by-pass port 35 in each piston from the low pressure side to the high pressure side of the same but during the high pressure strokes of the pistons which is in the direction of the arrows associated with the same in Fig. 2, the check valves 36 close and prevent the passage of the resistance liquid through the by-pass ports 35 and thereby cause this liquid to exert a greater shock absorbing effect.

Regulation of the shock absorbing capacity of the instrument is effected in the present instance by controlling passages 37, 38 leading from the rear and front ends of a valve seat 39 in the center of the hub to the periphery of the same on opposite sides of the pistons, and a regulating valve 40 adjustable toward and from the seat 40 and mounted on a longitudinal valve stem 41 arranged in the bore 43 of the shaft, a screw joint 42 connecting the stem and shaft, and a handle 44 on the front end of the shaft for turning the same.

Air is permitted to vent from the upper end of one or both working chambers into the upper part of the replenishing chamber by one or more vents or passages 53 formed in the upper part of the front wall 13 of the body.

Heretofore the partition sections 8, 8 were connected with each other by a collar and the same were also machined and fitted in longitudinal grooves in the cylindrical bore of the peripheral wall 10 so as to maintain the same in the proper relation to each other and to the pistons and the body, which involved considerable expense.

For the purpose of simplifying the mounting of the partition sections in the body and reducing the cost of manufacture, these sections of the partition are mounted in accordance with my invention as follows:

In the front wall of the body are formed a plurality of welding openings each of which extends from the front side to the rear side of the same in line with one of the partition sections so that the front face of the latter is exposed in said opening. The rear part 45 of this opening is preferably of reduced cylindrical form or of comparatively small diameter while the front part 46 thereof is of angular and enlarged cylindrical form or of greater diameter. Into each of these welding openings is placed a counter-sunk head shaped plug of welding metal which has a narrow or reduced cylindrical rear part 47 arranged in the reduced rear part of the respective opening and a wide or enlarged front part 48 of rearwardly tapering conical form which is arranged in the enlarged front part of the respective welding opening, as shown in Fig. 5. Said plugs preparatory to fastening the partition sections to the wall 12 fit loosely in said openings and are made of a metal which fuses at a lower temperature than this body wall and the sections of the partition, such for example as soft open hearth-steel.

The rear wall 13 of the body may also be provided with similar welding openings in line with the rear ends of the partition sections, each opening having a cylindrical inner part 49 of small diameter and a cylindrical outer part 50 of larger diameter, and each of these openings being constructed to receive loosely a fusible plug having a cylindrical inner part 51 of comparatively small diameter arranged in the small part 49 of the respective welding opening and a conical outer part 52 of larger diameter arranged in the enlarged outer part 50 of the respective welding opening, as shown in Fig. 5. An electrical welding current applied to the rear plugs and the body and partition sections will fuse these parts together and melt the plugs so as to fill the welding openings, as shown in Fig. 4, thereby further securing the partition sections in place, if this should be required.

The successive steps in the method of effecting the electrical welding and amalgamation of a plug, a partition and a body wall is illustrated in Figs. 8, 9 and 10 and proceed as follows:

After one of the welding plugs 51, 52 or 47, 48 has been placed in its respective welding openings so that the inner end of the small part thereof engages a partition section an electric current is passed through the same by means of a suitable welding apparatus which has one of its terminals 53 engaged with the large end of the respective welding plug and the other terminal 54 engaged with the partition section 8 and the adjacent part of the body, as shown for example in Fig. 8.

At this time only the inner end of the small part or shank of the welding plug engages the partition but the side of this shank is out of engagement from the body wall and the head of the plug is also not in contact with this wall, as shown in Fig. 8. After this is done and a gradually increasing pressure is applied between the plug and the partition section the heat caused by the electric current which is now flowing and the resistance existing at this time at the cooperating contact surfaces of the welding plug and the partition section causes the temperature at these surfaces to rise until a welding heat is reached. When this temperature is reached the inner or smaller end 47 or 51 of the plug is fused and welds to and becomes a part of the partition section.

As soon as the weld between the inner end of the plug and the partition has been completed the electrical resistance at these contacting surfaces is decreased and the maximum heat progresses outwardly along the shank of the plug and toward the large head thereof so that the central part of the plug becomes softer and even molten or plastic. As the plasticity of the plug extends progressively outward the inner part of the same becomes molten or collapses and merges into or amalgamates with the small inner part of the welding opening and the plug is shortened due to the pressure against the same as shown in Fig. 9.

As the plug shortens by reason of its inner part fusing or melting and adhering to the adjacent inner part of the welding openings the conical or large outer portion of the plug comes in contact with the inner corner 55 of the outer large or counterbored portion of the welding opening due to the greater pressure being applied at this time to the plug by the welding apparatus. When the conical head of the plug comes in contact with the inner corner 55 of the counterbored portion of the welding opening a large proportion of the current passes between the plug and the respective body wall at this point of contact as it forms a path of lesser resistance to electrical conductivity whereby the enlarged outer end or head of the plug and the inner corner 55 of the welding opening collapse and merge and the peripheral edge of the head of the plug engages the outer corner 56 of the welding opening and again establishes a point of less resistance which upon being traversed by the electrical current accompanied by high pressure causes the inner and outer corners 55 and 56 of the welding opening and the enlarged conical head of the plug to both collapse or melt and weld, as shown in Fig. 10, so as to completely fill the welding opening including the recess 57 of the counterbore between the corners 55 and 56 and form a strong and accurate welded union between the partition section and body wall and also a liquid tight joint between the same.

It will thus be noted that the electrical heating and fusing of the welding plug and its connection or amalgamation with the partition and the body wall progresses from the inner end toward the outer end of the plug as the point of greatest resistance shifts successively to different points of contact between the plug and the partition and body wall from the inner end to the outer end of the plug and thereby gradually breaks down the plug with the aid of pressure and causes the plug to completely fill the welding opening and produce a strong and leak-tight joint between the partition and the body.

By counterboring the welding openings so that the inner parts are of reduced cylindrical form and the outer parts of enlarged cylindrical form the same can be produced economically by tools and machines of standard construction, and by making the plugs in the form of rivets having cylindrical shanks and conical heads. These can also be produced at very low cost by rivet-making machines, thereby enabling this method to be employed for securing the partition in the body at a material reduction in cost of manufacture compared with the methods heretofore in use and at the same time securing a superior product so far as strength and durability are concerned.

For the purpose of ascertaining this action, one of the welded reservoirs with the wing was sawed through, the exposed section polished and etched, and a micro-photograph taken of the surface. It was evident from the print of this photograph that the weld had taken place both at the contact of the steel plug and the partition, and at the circumference of the steel plug, it being specially complete around the beveled portion of the head of the plug. It was also noticeable that the countersunk shape of the original hole had been entirely melted away and the resulting contact surface was approximately the original shape of the head of the plug. From the structure shown in the print, it was apparent that the central portion of the steel plug had become molten during the process, as shown by the larger crystals in this area.

Among the advantages obtained by this method of attaching the partition to the body wall is a high mechanical strength since it results in a complete weld between the plug and the partition and a liquid tight joint because the weld extends completely around the circumference of the plug.

I claim as my invention:

The herein described method of connecting a wall of a working chamber for a hydraulic shock absorber and a partition therein, which method consists in providing said wall with an opening in line with said partition, said opening having a reduced cylindrical inner part and an enlarged cylindrical outer part to provide inner and outer corners, placing a conical headed rivet in said opening with its ends against said partition but with all its other surfaces disconnected from the wall surrounding said opening and said corners, and then applying an electrical welding terminal to the head of said plug under pressure to cause all of the welding current to primarily flow through said plug for intimate welding thereof to said partition and fusion of the plug shank for intimate welding thereof to said wall at the inner part of the opening therein and then to cause the plug head to successively engage said corners for the generation of welding heat thereat and eventual fusion of the head and the metal of said corners for intimate welding of the head to said wall at the enlarged section of said opening.

In testimony whereof I hereby affix my signature.

RICHARD POWIS.